United States Patent
Arifuku

(10) Patent No.: US 10,659,650 B2
(45) Date of Patent: May 19, 2020

(54) IMAGE READING APPARATUS, IMAGE FORMING APPARATUS, AND CONTROL METHOD

(71) Applicant: SHARP KABUSHIKI KAISHA, Sakai, Osaka (JP)

(72) Inventor: Naoya Arifuku, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/259,602

(22) Filed: Jan. 28, 2019

(65) Prior Publication Data

US 2019/0238710 A1    Aug. 1, 2019

(30) Foreign Application Priority Data

Jan. 31, 2018  (JP) .................... 2018-014236

(51) Int. Cl.
*H04N 1/32* (2006.01)
*H04N 1/00* (2006.01)

(52) U.S. Cl.
CPC ....... *H04N 1/3263* (2013.01); *H04N 1/00013* (2013.01); *H04N 1/00453* (2013.01)

(58) Field of Classification Search
CPC ............. H04N 1/3263; H04N 1/00453; H04N 1/00013
USPC ...................................................... 358/1.15
See application file for complete search history.

(56) References Cited

U.S. PATENT DOCUMENTS

| 7,227,661 B2* | 6/2007 | Matsunoshita ....... G06T 1/0064 358/1.14 |
| 2005/0134893 A1* | 6/2005 | Han ........................ G06F 3/121 358/1.14 |
| 2018/0167525 A1* | 6/2018 | Ogasawara .............. H04N 1/00 |
| 2019/0124229 A1* | 4/2019 | Ishino .................... H04N 1/393 |

FOREIGN PATENT DOCUMENTS

JP        2015-056794 A        3/2015

* cited by examiner

*Primary Examiner* — Tammy Paige Goddard
*Assistant Examiner* — Darryl V Dottin
(74) *Attorney, Agent, or Firm* — ScienBiziP, P.C.

(57) ABSTRACT

An image forming apparatus includes a CPU. According to user operations, the CPU causes an image reading unit to read, at once, the front surfaces of documents placed on the respective area divisions of a document platen, and obtains individual front surface images. The CPU causes the image reading unit to read the back surfaces of the documents at once, and obtains individual back surface images. The CPU generates image files, each including a front surface image and a back surface image, for the respective area divisions. The CPU determines whether or not a read error is present in each of the obtained images. When an image file includes an image having a read error, the CPU stores, in an HDD, the image file with a file name indicating presence of a read error.

7 Claims, 12 Drawing Sheets

IMAGE READING APPARATUS, IMAGE FORMING APPARATUS, AND CONTROL METHOD

BACKGROUND

1. Field

The present disclosure relates to an image reading apparatus, an image forming apparatus, and a control method. In particular, the present disclosure relates to an image reading apparatus, an image forming apparatus, for example, which generate, from an image, image files for their respective areas obtained through division of the read area of a document reading table. The image is obtained by reading documents placed in the respective areas.

2. Description of the Related Art

An example of image reading apparatuses of the related art is disclosed in Japanese Unexamined Patent Application Publication No. 2015-56794. The information processing apparatus described in Japanese Unexamined Patent Application Publication No. 2015-56794 obtains the front surfaces of multiple business cards as first image data, and also obtains the back surfaces of the business cards as second image data. Through analysis of the first image data, front-surface business card images indicating the respective business cards are extracted, and pieces of positional information corresponding to the respective extracted front-surface business card images are generated and obtained. Similarly, through analysis of the second image data, back-surface business card images indicating the respective business cards are extracted, and pieces of positional information corresponding to the respective extracted back-surface business card images are generated and obtained. On the basis of the pieces of positional information of the front-surface business card images and the pieces of positional information of the back-surface business card images, each of the front-surface business card images is associated with one of the back-surface business card images. Thus, a single business card image is determined for each business card. For each of the business card images obtained through the associating operation, it is determined whether or not the front-surface business card image and the back-surface business card image are located at the same position by comparing the positional information of the front-surface business card image with the positional information of the back-surface business card image. In addition, for each of the business card images obtained through the associating operation, it is determined whether or not the front-surface business card image is the same as the back-surface business card image by comparing the front-surface business card image with the back-surface business card image. On the basis of the determination result obtained from at least one of the determinations, control is exerted so that an image displayed on a display screen of the operation unit for displaying various images is made different. In addition, the images determined for the respective business cards are stored in a storage unit on a business-card-by-business-card basis.

The information processing apparatus of the related art determines a business card image, in which a front-surface business card image is associated with a back-surface business card image, for each business card on the basis of whether or not the front-surface business card image and the back-surface business card image are located at the same position and whether or not the front-surface business card image is the same as the back-surface business card image, and stores the business card image in a storage unit as a single image file. Therefore, to determine whether or not the front surfaces and/or the back surfaces of the business cards have been successfully read, the stored business card images are to be displayed and checked. Displaying and checking the business card images is troublesome. A larger number of business card images to be checked increases the time and effort.

It is desirable to provide a new image reading apparatus, a new image forming apparatus, and a control method for the image reading apparatus.

It is also desirable to provide an image reading apparatus, an image forming apparatus, and a control method for the image reading apparatus, which achieve an easy check for whether or not images have been successfully read, without displaying the images.

SUMMARY

According to an aspect of the disclosure, there is provided an image reading apparatus in which a read area of a document platen is divided into a plurality of areas and in which image data is obtained by performing a read operation of reading at once images of a plurality of documents placed in the respective areas. The image data describes a corresponding one of the documents. The image data is obtained in association with a corresponding one of the areas in which the corresponding one of the plurality of documents is placed. The apparatus includes a determination unit and an operation executing unit. The determination unit determines whether or not the image data has a read error. The operation executing unit performs a different operation on the image data depending on whether or not the image data has a read error.

According to another aspect of the disclosure, there is provided an image forming apparatus including an image reading apparatus in which a read area of a document platen is divided into a plurality of areas and in which image data is obtained by performing a read operation of reading at once images of a plurality of documents placed in the respective areas. The image data describes a corresponding one of the documents. The image data is obtained in association with a corresponding one of the areas in which the corresponding one of the plurality of documents is placed. The image forming apparatus includes a determination unit and an operation executing unit. The determination unit determines whether or not the image data has a read error. The operation executing unit performs a different operation on the image data depending on whether or not the image data has a read error.

According to another aspect of the disclosure, there is provided a control method for an image reading apparatus in which a read area of a document platen is divided into a plurality of areas and in which image data is obtained by performing a read operation of reading at once images of a plurality of documents placed in the respective areas. The image data describes a corresponding one of the documents. The image data is obtained in association with a corresponding one of the areas in which the corresponding one of the plurality of documents is placed. The method includes determining whether or not the image data has a read error; and performing a different operation on the image data depending on whether or not the image data has a read error.

DESCRIPTION OF THE EMBODIMENTS

First Embodiment

Figure 1:
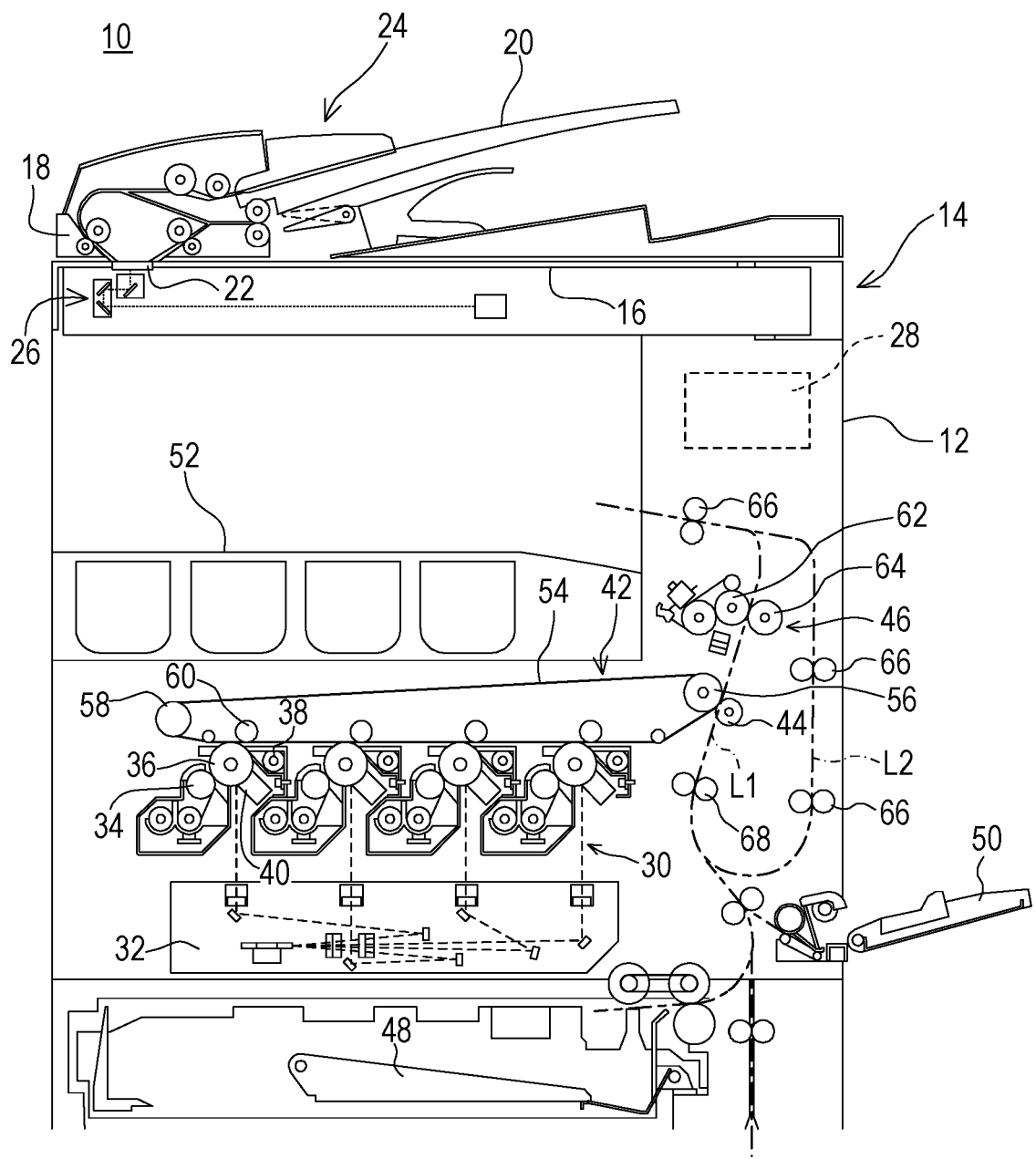
FIG. 1 is a perspective view of the appearance of an image forming apparatus according to an embodiment of the present disclosure.

Referring to FIG. 1, an image reading apparatus 14 which indicates a first embodiment of the present disclosure is used in an image forming apparatus 10 forming an image on a sheet by using an electrophotographic system. The basic configuration of the image forming apparatus 10 will be briefly described. In the first embodiment, the image forming apparatus 10 is a multifunction peripheral (MFP) having a copying function, a printer function, a scanner function, a facsimile function, and the like.

As illustrated in FIG. 1, the image forming apparatus 10 includes an apparatus body 12 having an image forming unit 30 and the like, and the image reading apparatus 14 disposed on the upper side of the apparatus body 12.

The image reading apparatus 14 includes a document platen 16 formed of a transparent material such as platen glass. On the upper side of the document platen 16, a document pressing cover 18 is attached, for example, via a hinge so as to be openable. The document pressing cover 18 is provided with an automatic document feeder (ADF) 24 which automatically feeds documents, which are placed on a document tray 20, one by one to an image reading position 22. On the front side of the document platen 16, a touch panel 98 (not illustrated) receiving input operations such as print instructions from users, and an operation unit or operation panel (not illustrated) including an operation button 102 are disposed.

The image reading apparatus 14 has, therein, an image reading unit 26 including a light source, multiple mirrors, an imaging lens, and a line sensor. The image reading unit 26 exposes the front surface of a document to light by using the light source, and guides reflected light, which is obtained through reflection from the front surface of the document, to the imaging lens by using the multiple mirrors. The image reading unit 26 uses the imaging lens to converge the reflected light to photo detectors of the line sensor for image formation. In the line sensor, the brightness and chromaticity of the reflected light converged to the photo detectors are detected. Image data based on the image of the front surface of the document is generated. As the line sensor, for example, a charge coupled device (CCD) or a contact image sensor (CIS) is used.

When a document fed by the ADF 24 is to be read, a scanning unit including the light source and the multiple mirrors is located at a fixed position under the image reading position 22. When a document placed on the document platen 16 is to be read, the scanning unit is moved in the sub-scanning direction. The sub-scanning direction is the left-right direction when the image forming apparatus 10 is viewed from the front, that is, the left-right direction in FIG. 1. The main scanning direction is the front-back direction of the image forming apparatus 10 when the image forming apparatus 10 is viewed from the front, that is, the direction vertical to the plane of FIG. 1.

The apparatus body 12 has, therein, a controller 28 including a central processing unit (CPU) 80 and memories (a random-access memory (RAM) 84 and a hard disk drive (HDD) 86) which are described below, the image forming unit 30, and the like (see FIG. 2). The controller 28 transmits control signals to the units of the image forming apparatus 10 in response to input operations and the like received by the operation unit such as the touch panel 98, and causes the image forming apparatus 10 to perform various operations. The controller 28 which controls the entire image forming apparatus 10 also serves as a control device of the image reading apparatus 14.

The image forming unit 30, which includes an exposure unit 32, developers 34, photoreceptor drums 36, cleaner units 38, chargers 40, an intermediate transfer belt unit 42, a transfer roller 44, and a fixing unit 46, forms an image on a sheet conveyed from a paper feed tray 48 or a manual paper feed tray 50, and discharges the sheet, on which the image has been formed, to a paper output tray 52. As image data for forming an image on a sheet, for example, image data read by the image reading unit 26 or image data transmitted from an external computer is used.

Image data handled in the image forming apparatus 10 is data corresponding to color images of four colors, black (K), cyan (C), magenta (M), and yellow (Y). Accordingly, four developers 34, four photoreceptor drums 36, four cleaner units 38, and four chargers 40 are provided to form four types of latent image which correspond to the respective colors, forming four image stations.

The photoreceptor drums 36 are image bearing members, in each of which a photoreceptive layer is formed on the front surface of a conductive cylindrical body. The chargers 40 are members for charging the front surfaces of the photoreceptor drums 36 at a given potential. The exposure unit 32 formed as a laser scanning unit (LSU) including a laser emitting unit and reflecting mirrors exposes the charged front surfaces of the photoreceptor drums 36 to light, thus forming electrostatic latent images corresponding to image data on the front surfaces of the photoreceptor drums 36. The developers 34 make the electrostatic latent images formed on the front surfaces of the photoreceptor drums 36 visible by using four color (YMCK) toners. The cleaner units 38 remove toner remaining on the front surfaces of the photoreceptor drums 36 after development and image transfer.

The intermediate transfer belt unit 42, which includes an intermediate transfer belt 54, a driving roller 56, a driven roller 58, and four intermediate transfer rollers 60, is disposed on the upper side of the photoreceptor drums 36. The intermediate transfer belt 54 is disposed so as to be in contact with the photoreceptor drums 36. The intermediate transfer rollers 60 are used to transfer toner images of the colors, which are formed on the photoreceptor drums 36, sequentially so that the transferred images are superposed on the intermediate transfer belt 54. Thus, a multi-color toner image is formed on the intermediate transfer belt 54. The transfer roller 44 is disposed so as to press the intermediate transfer belt 54 against the driving roller 56. A sheet passes through the transfer nip portion between the intermediate transfer belt 54 and the transfer roller 44. Thus, the toner image having been formed on the intermediate transfer belt 54 is transferred onto the sheet.

The fixing unit 46, which includes a heat roller 62 and a pressure roller 64, is disposed in an upper portion of the transfer roller 44. The heat roller 62 is set so as to reach a given fixing temperature. A sheet passing through the nip region between the heat roller 62 and the pressure roller 64 causes the toner image, which has been transferred onto the sheet, to be molten, mixed, and pressed, resulting in thermal fixing of the toner image onto the sheet.

In the apparatus body 12 described above, a first sheet conveying path L1 is formed. The first sheet conveying path L1 is used to convey a sheet from the paper feed tray 48 or the manual paper feed tray 50 via registration rollers 68, the transfer roller 44, and the fixing unit 46 to the paper output tray 52. A second sheet conveying path L2 for, in duplex printing on a sheet, returning the sheet, which has passed through the fixing unit 46 after single-side printing, to the first sheet conveying path L1 is formed. The sheet is returned on the upstream side, in the sheet conveying direction, of the transfer roller 44. Along the first sheet conveying path L1 and the second sheet conveying path L2, multiple conveying rollers 66 for conveying a sheet in the sheet conveying direction are appropriately disposed.

In single-side printing (image formation) in the apparatus body 12, sheets are guided one by one from the paper feed tray 48 or the manual paper feed tray 50 to the first sheet conveying path L1, and are conveyed to the registration rollers 68 by conveying rollers 66. At a timing at which the registration rollers 68 aligns the leading edge of each sheet with the leading edge of image information on the intermediate transfer belt 54, the sheet is conveyed to the transfer roller 44 (transfer nip portion). Thus, a toner image is transferred onto the sheet. After that, the sheet passes through the fixing unit 46 (fixing nip portion) so that unfixed toner on the sheet is melt by heat and fixed, and the sheet is discharged onto the paper output tray 52.

In contrast, in duplex printing, when the trailing edge of a sheet having been subjected to single-side printing and having passed through the fixing unit 46 reaches the conveying rollers 66 located near the paper output tray 52, the conveying rollers 66 are made to rotate reversely. Thus, the sheet goes backward and is guided to the second sheet conveying path L2. The sheet guided to the second sheet conveying path L2 is conveyed through second sheet conveying path L2 by conveying rollers 66, and is guided to the first sheet conveying path L1 on the upstream side, in the sheet conveying direction, of the registration rollers 68. At that time point, the front-back orientation of the sheet is inverted. After that, the sheet passes the transfer roller 44 and through the fixing unit 46. Thus, printing is performed on the back surface of the sheet.

Figure 2:
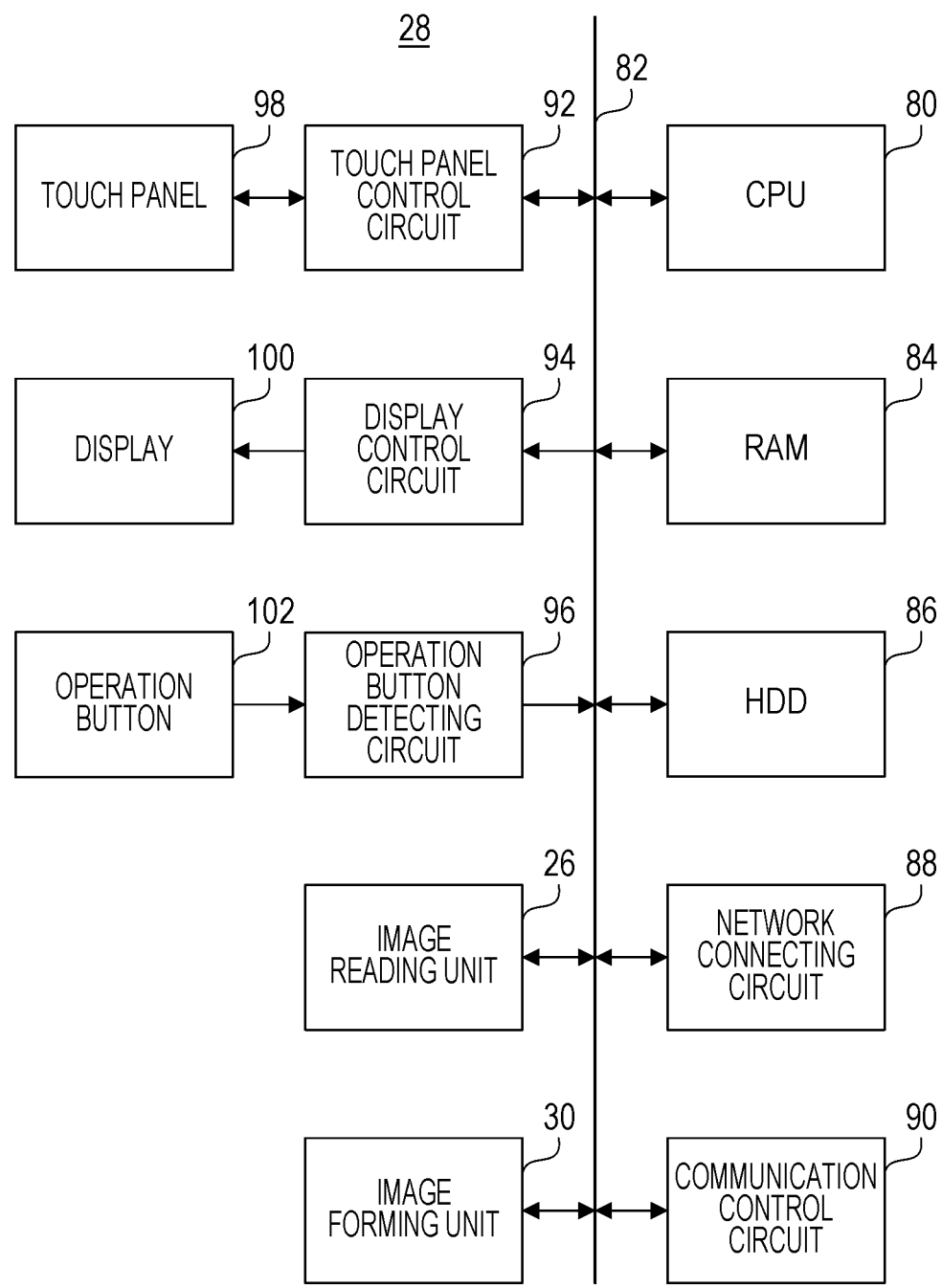
FIG. 2 is a block diagram illustrating the electrical configuration of the image forming apparatus illustrated in FIG. 1.

FIG. 2 is a block diagram illustrating the electrical configuration of the image forming apparatus 10 illustrated in FIG. 1. Referring to FIG. 2, the image forming apparatus 10 includes the CPU 80. The CPU 80 is connected to the RAM 84, the HDD 86, a network connecting circuit 88, a communication control circuit 90, a touch panel control circuit 92, a display control circuit 94, an operation button detecting circuit 96, the image reading unit 26, and the image forming unit 30 via a bus 82. The touch panel control circuit 92 is connected to the touch panel 98. The display control circuit 94 is connected to a display 100. The operation button detecting circuit 96 is connected to the operation button 102.

The CPU 80 exerts overall control on the image forming apparatus 10. The RAM 84 is used as a work area and a buffer area of the CPU 80. The HDD 86, which is a main memory of the image forming apparatus 10, stores the following types of data: various programs for controlling the operations of the image forming apparatus 10; data such as a print job transmitted from an external computer via the network connecting circuit 88; image data which is read by the image reading unit 26; and image data received by the communication control circuit 90.

The image forming apparatus 10 is provided with a read-only memory (ROM) and a real time clock (RTC) which are not illustrated. Boot programs of the image forming apparatus 10 are stored in the ROM. The RTC is a clock circuit which counts date and time (including Christian Era year, month, day, and time (hour/minute/second)).

In the first embodiment, an external computer indicates a portable terminal, a personal computer, a server, another image forming apparatus, or the like.

The network connecting circuit 88, which is a communication circuit for establishing a connection with networks, such as a local-area network (LAN) and the Internet, communicates with an external computer according to instructions from the CPU 80 by using a protocol such as Transmission Control Protocol/Internet Protocol (TCP/IP).

The communication control circuit 90, which is a modem, is connected to a communication line such as a telephone line and receives/transmits image data from/to a facsimile, which is a communication target, according to instructions from the CPU 80. The image data received from a facsimile, which is a communication target, is temporarily stored in the HDD 86. The touch panel control circuit 92 provides the touch panel 98 with a desirable voltage and the like, and detects a touch operation (touch input) in the touch enabled area of the touch panel 98 so as to output, to the CPU 80, touch coordinates data indicating the position of the touch input.

The touch panel 98 is a general-purpose touch panel, and any system, such as the capacitive system, the electromagnetic induction system, the resistance film system, or the infrared system, may be used. In the first embodiment, a touch panel of the capacitive system is used as the touch panel 98, and is disposed on the display surface of the display 100. Alternatively, a touch panel display in which the touch panel 98 and the display 100 are formed as a unified unit may be used.

The display control circuit 94 includes a graphics processing unit (GPU) and a video RAM (VRAM). Under instructions from the CPU 80, the GPU uses image generation data, which is stored in the RAM 84, to generate, in the VRAM, display image data for displaying various screens on the display 100, and outputs the generated display image data on the display 100. As the display 100, for example, a liquid crystal display (LCD) or an electro-luminescence (EL) display may be used.

The operation button detecting circuit 96 outputs, to the CPU 80, an operation signal or operation data according to an operation on the operation button 102. The operation button 102, which is a hardware button or switch such as a power button, is disposed, for example, on the top or side surface of the apparatus body 12.

The image reading apparatus 14 (image forming apparatus 10) has a multi-crop scanning function. A multi-crop scanning function means a function of reading multiple documents at once, which are placed on the document platen 16, with the document pressing cover 18 remaining open, and generating image data individually for the multiple documents.

The reason why the document pressing cover 18 remains open is that an image corresponding to a portion other than documents is made black, and images corresponding to the documents are thus cut out by using the difference in contrast between the images which correspond to the documents and the images which do not correspond to the documents. Therefore, if the documents placed on the document platen 16 are covered with a black (may be other dark colors excluding white) mat for the background, the document pressing cover 18 does not necessarily remain open. That is, the multi-crop scanning function does not involve the state in which the document pressing cover 18 is open.

Figure 3:
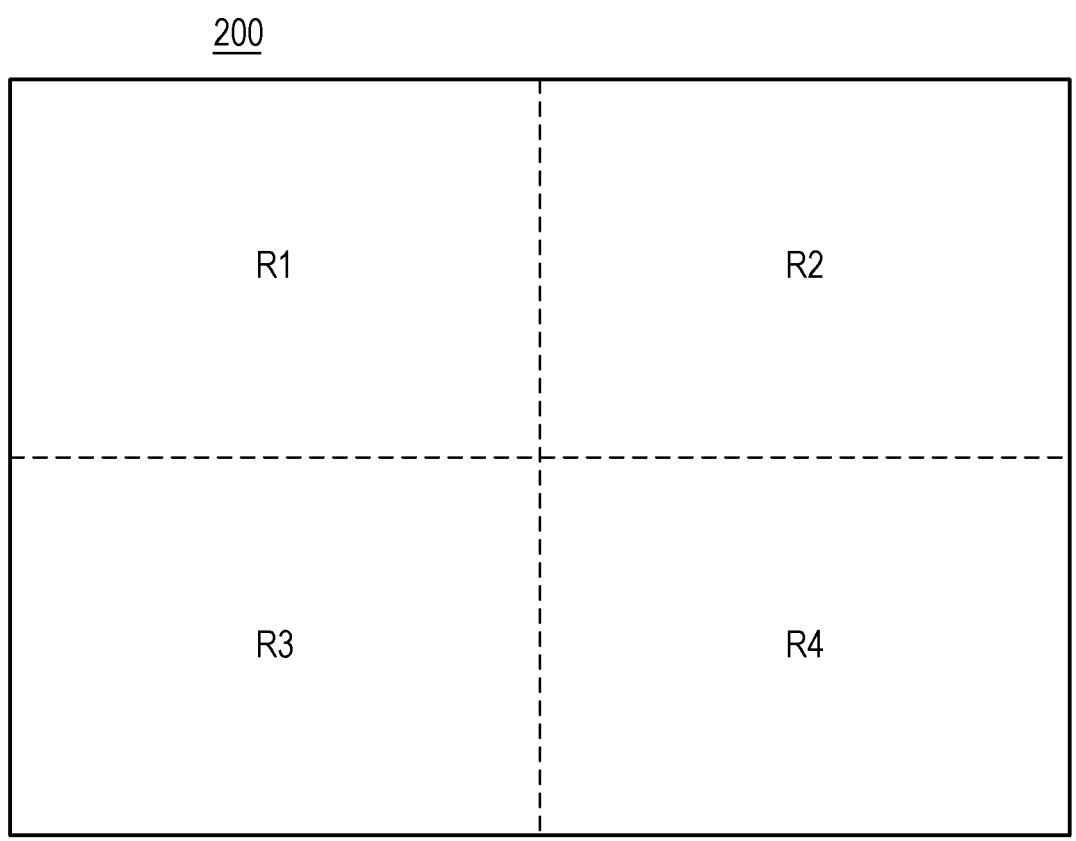
FIG. 3 is a diagram for describing area divisions obtained through division of a read area in the image reading apparatus illustrated in FIG. 1.

FIG. 3 is a diagram for describing an example in which a read area 200 of the document platen 16 is divided into multiple areas (in the first embodiment, four area divisions R1, R2, R3, and R4). In the document platen 16, the read area 200 indicates the entire document readable area. In FIG. 3, the dotted lines indicate divisions of the read area 200. Thus, areas (hereinafter referred to as "area divisions") R1 to R4 obtained through the division are illustrated. Actually, such dotted lines are not displayed. For example, in execution of the multi-crop function, a user switches on, on a setting screen, the mode (hereinafter referred to as the "multi-crop mode") in which the function is used. At that time, an image describing that the read area 200 are divided as illustrated in FIG. 3 is displayed on the setting screen. In contrast to the multi-crop mode, the mode in which the normal reading function of reading documents one by one is used is called the normal mode. When the multi-crop mode has not been switched on, the normal mode has been switched on.

The image reading apparatus 14 (image forming apparatus 10) according to the first embodiment uses the multi-crop scanning function to perform the following operations: scan documents; obtain front surface images and back surface images of the documents; generate multiple image files in which the pieces of image data, which correspond to the obtained front surface images and the obtained back surface images of the documents, are associated with each other on the basis of the area divisions R1 to R4; and store the generated image files in a storage medium. That is, for each area division Ri (i=1, 2, 3, or 4), an image file including the front surface image and the back surface image of the document placed in the same area division Ri is generated. The multiple generated image files are stored in the storage medium.

A document is such that an image having at least one of the types of image, that is, characters, figures, and photos, is illustrated on the front surface and the back surface. As a typical example, a document corresponds to a business card or a postcard. In the first embodiment, a storage medium indicates the HDD 86 included in the image forming apparatus 10. Alternatively, the storage medium may be an external storage medium mounted on the image forming apparatus 10, or an HDD included in an external computer connected via the network connecting circuit 88 to the image forming apparatus 10. As the external storage medium, a Universal Serial Bus (USB) memory may be used.

Specific operations of the image reading apparatus 14 (image forming apparatus 10) in the multi-crop mode will be described. A user of the image reading apparatus 14 operates the operation panel, which includes the touch panel 98 and the display 100, of the image forming apparatus 10, and switches on the multi-crop mode on the setting screen. After the user switches on the multi-crop mode, the user places multiple documents on the document platen 16 of the image reading apparatus 14. Then, the user gives the image reading apparatus 14 an instruction to read the front surfaces of the documents.

Figure 4:
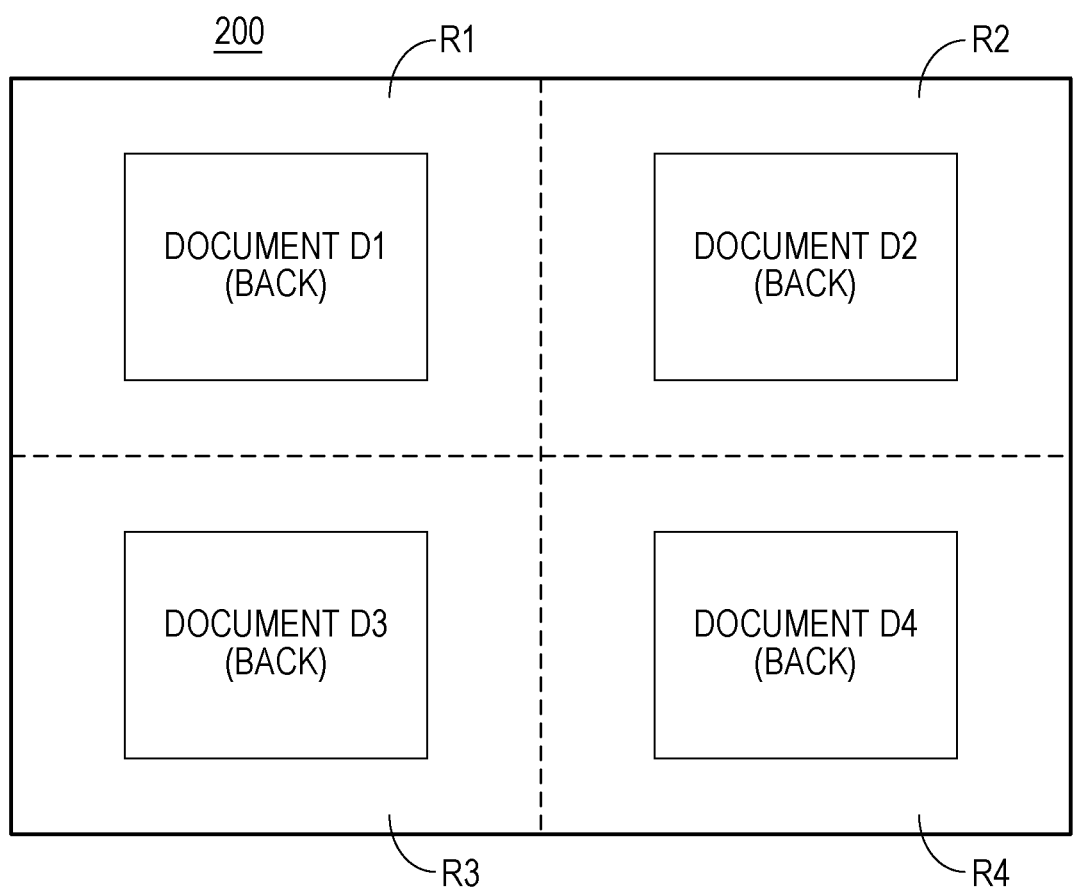
FIG. 4 is a diagram illustrating an exemplary state in which documents are placed on a document reading table when the front surfaces are to be read.

FIG. 4 illustrates an exemplary state in which multiple documents are placed on the document platen 16 when the front surfaces of the documents are to be scanned. In the example illustrated in FIG. 4, the case in which documents of the same size and shape are placed on the document platen 16 is illustrated. However, the sizes and/or shapes of the documents may be different from each other. The multiple documents may be of different types. For example, business cards and postcards may be placed on the document platen 16.

The documents are disposed within the respective area divisions R1 to R4 obtained through division of the read area 200 of the document platen 16. In order to scan the front surfaces of the documents, a user places, on the document platen 16, the documents whose front surfaces face downward, that is, as illustrated in FIG. 4, the documents whose back surfaces face upward. Then, the user operates a start button on the operation panel, thus giving a reading instruction to read the documents. The start button is a software button disposed on the operation panel. However, this is merely exemplary. The start button may be a hardware button disposed on the operation panel or the apparatus body 12.

In response to the reading instruction from the user, the image reading apparatus 14 reads the documents. Thus, the image reading apparatus 14 reads an image (hereinafter referred to as a "whole front-side image") which corresponds to the entire read area 200 and which includes images (hereinafter referred to as "front-side images") of the front surfaces of the documents placed on the document platen 16. Then, the image reading apparatus 14 generates data (hereinafter referred to as "whole front-side image data") about the whole front-side image which has been read.

After generation of the whole front-side image data, the whole front-side image data is analyzed, and individual pieces of data for the front-side images of the documents are sequentially cut out (extracted) from the whole front-side image data. Thus, independent and individual pieces of data (hereinafter referred to as "individual front-side image data") for the front-side images are generated. At that time, for each document, identification information about the corresponding one of the area divisions R1 to R4, in which the document is placed, is added to the individual front-side image data corresponding to the document. If the same coordinates system as the coordinates system of the read area 200 of the document platen 16 is used to manage the pixels of the whole front-side image, it is easy to find the area division, among the area divisions R1 to R4, where the document corresponding to the individual front-side image is placed. The reason why identification information for the corresponding one of the area divisions R1 to R4 is added to the individual front-side image data is that another type of image data ("individual back-side image data" described below) for the same corresponding one of the area divisions R1 to R4 is to be associated with the individual front-side image data.

The method of generating individual front-side image data from whole front-side image data by analyzing the whole front-side image data may be implemented by using a known technique for implementing a multi-crop scanning function. For example, a method of cutting out document images, which is described in Japanese Unexamined Patent Application Publication No. 2002-10059, may be used.

The method itself of generating individual front-side image data from whole front-side image data is unimportant in the disclosure of the present application. As described above, a known technique may be used. Accordingly, detailed description about this method will be skipped.

When the pieces of individual front-side image data for the respective area divisions R1 to R4 are generated, that is, the pieces of individual front-side image data for all of the documents are generated, a message indicating that the documents are to be turned over is displayed on the display 100 of the image forming apparatus 10.

Figure 5:
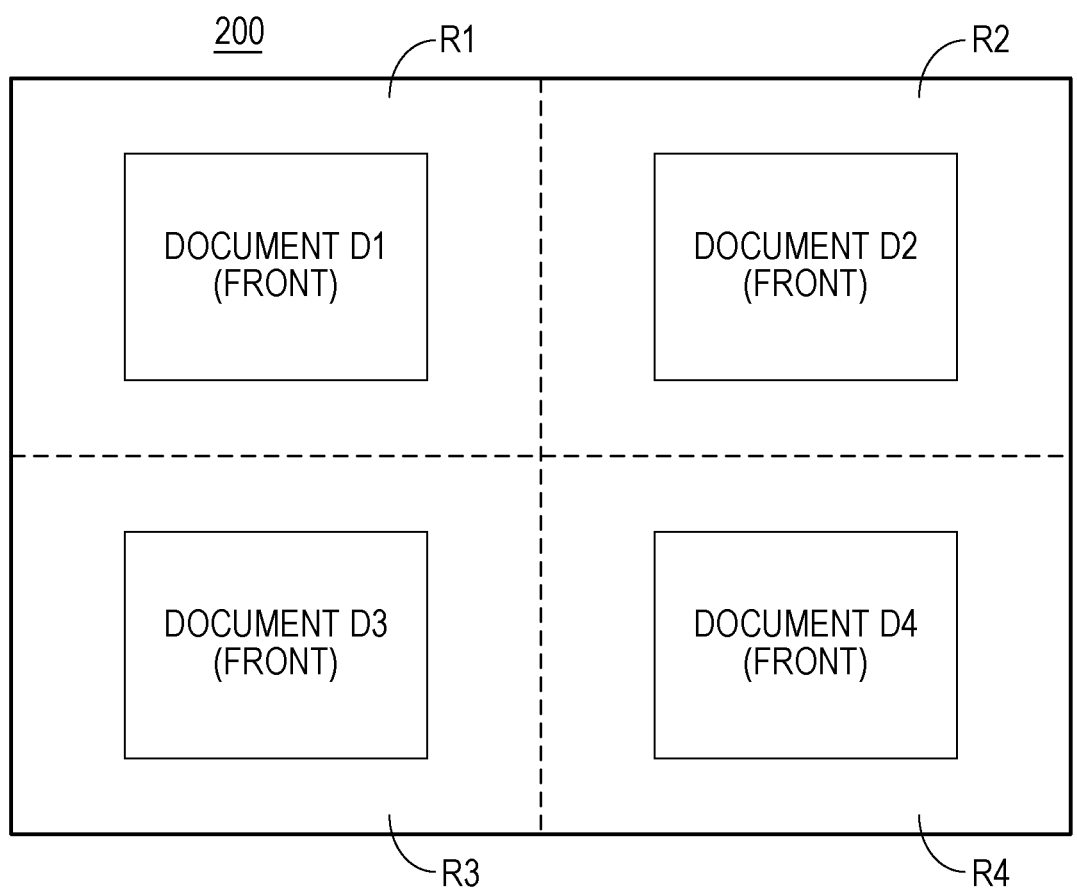
FIG. 5 is a diagram illustrating an exemplary state in which documents are placed on a document reading table when the back surfaces are to be read.

The user turns over the documents placed as illustrated in FIG. 4 on the document platen 16 of the image reading apparatus 14 so that the back surfaces of the documents face downward. As illustrated in FIG. 5, the user places the documents whose front surfaces face upward. The user operates the start button on the operation panel to give a reading instruction.

In response to the reading instruction from the user, the image reading apparatus 14 reads the documents. Thus, the image reading apparatus 14 reads an image (hereinafter referred to as a "whole back-side image") which corresponds to the entire read area 200 and which includes images (hereinafter referred to as "back-side images") of the back surfaces of the documents placed on the document platen 16. The image reading apparatus 14 generates data (hereinafter referred to as "whole back-side image data") about the whole back-side image which has been read.

After generation of the whole back-side image data, the whole back-side image data is analyzed, and individual pieces of data for the back-side images of the documents are sequentially cut out (extracted) from the whole back-side image data. Thus, independent and individual pieces of back-side image data (hereinafter referred to as "individual back-side image data") are generated. At that time, for each document, identification information about the corresponding one of the area divisions R1 to R4, in which the document is placed, is added to the individual back-side image data corresponding to the document.

The method of generating individual back-side image data from whole back-side image data by analyzing the whole back-side image data may be implemented by using the known technique described above.

When the pieces of individual front-side image data for the respective area divisions R1 to R4 are generated, that is, pieces of individual back-side image data for all of the documents are generated, pieces of file data for the respective area divisions R1 to R4, that is, for the respective documents are generated. The file data is image file data in which individual back-side image data and individual front-side image data, to both of which the same identification information is added, are added together. The process of generating such an image file is performed for each piece of individual back-side image data (individual front-side image data).

For example, an image file including an image in which a front-side image and a back-side image are arranged in a single page is generated. In another example, an image file including a front-side image page and a back-side image page is generated.

A generated image file, to which a file name is automatically provided, is stored in the HDD 86. The file name is constituted by the following two types of string: a string expressing, by using numbers, Christian Era year, month, day, and time (hour/minute/second) at which the scanning was completed (or started); and a string (r1, r2, r3, or r4) expressing, by using a symbol, the corresponding one of the area divisions R1 to R4 indicated by the identification information added to the individual front-side image data and the individual back-side image data included in the image file. For example, in the case where the date and time when scanning was completed is Jan. 18, 2018 10:23:51 a.m., and where the image file, to which a files name is to be added, is an image file in which the individual front-side image data and the individual back-side image data for the area division R3 are added together, "r3_20180118_102351.pdf" is provided as the file name. The extension of the file name is appropriately changed in accordance with the data format of the image data. In addition, Christian Era year, month, day, and time may be obtained from the RTC. Thus, the multi-crop function may be used to, for the area divisions R1 to R4, obtain images of multiple documents in a single scan operation, perform this process on the front side and the back side of the documents, and generate image files, in each of which the individual front-side image data and the individual back-side image data are added together.

However, in the first embodiment, when a read error is present in individual front-side image data and/or individual back-side image data, the image file is stored in the HDD 86 so that a user recognizes presence of a read error without displaying the image (without opening the image file). That is, in the first embodiment, between the case in which a read error is present in individual front-side image data and/or individual back-side image data and the case in which no read errors are present in the individual front-side image data and the individual back-side image data, different processes are performed on the individual front-side image data and the individual back-side image data. Accordingly, if the process result is viewed, a user may recognize whether or not a read error has occurred, without displaying the image data. That is, a user may easily know whether or not images have been successfully read.

The case in which a read error is present corresponds, for example, to the following cases: the case in which a skew angle of a scanned image exceeds a certain angle (hereinafter referred to as "first case"); the case in which a portion of a document is determined to be folded (hereinafter referred to as a "second case"); the case in which the orientation of a scanned image is different from a given orientation (hereinafter referred to as a "third case"); and the case in which the data amount of image data is very small (hereinafter referred to as a "fourth case").

A skew angle means an inclination angle of an scanned image with respect to a given coordinate axis. A given coordinate axis is an axis parallel to the vertical axis or the horizontal axis with which the area divisions R1 to R4 are defined. The skew angle corresponds to an inclination angle of a document with respect to a vertical or horizontal side defining the read area 200 of the document platen 16.

For the first case, the second case, and the third case described above, a method of determining whether or not a read error is present is a known technique. For example, a determination method described in Japanese Unexamined Patent Application Publication No. 2005-311766 may be used. The determination method itself is unimportant in the disclosure of the present application, and a known technique may be used. Therefore, detailed description about the method will be skipped.

For the fourth case described above, a threshold for determining that the data amount is very small is preset. When the data amount of image data is smaller than the threshold, it may be determined that a read error is present.

Whether or not a read error is present is determined for each of the area divisions R1 to R4 in both the case where individual front-side image data is generated and where individual back-side image data is generated. Alternatively, when individual back-side image data is generated, before image files are generated, it may be determined whether or not a read error is present, for every piece of individual front-side image data and individual back-side image data.

In the first embodiment, when a read error is present in the individual front-side image data or the individual back-side image data included in an image file, a string indicating presence of a read error is added to the file name of the image file. For example, a string, such as "NG_" or "ERR_", is added at the top of the file name.

Thus, when a read error is present in the individual front-side image data or the individual back-side image data included in an image file, a file name including a string indicating presence of the read error is added. Accordingly, even when the image data is not displayed, just a glance of the file name enables a user to recognize easily whether or not the document has been successfully read.

Figure 6:
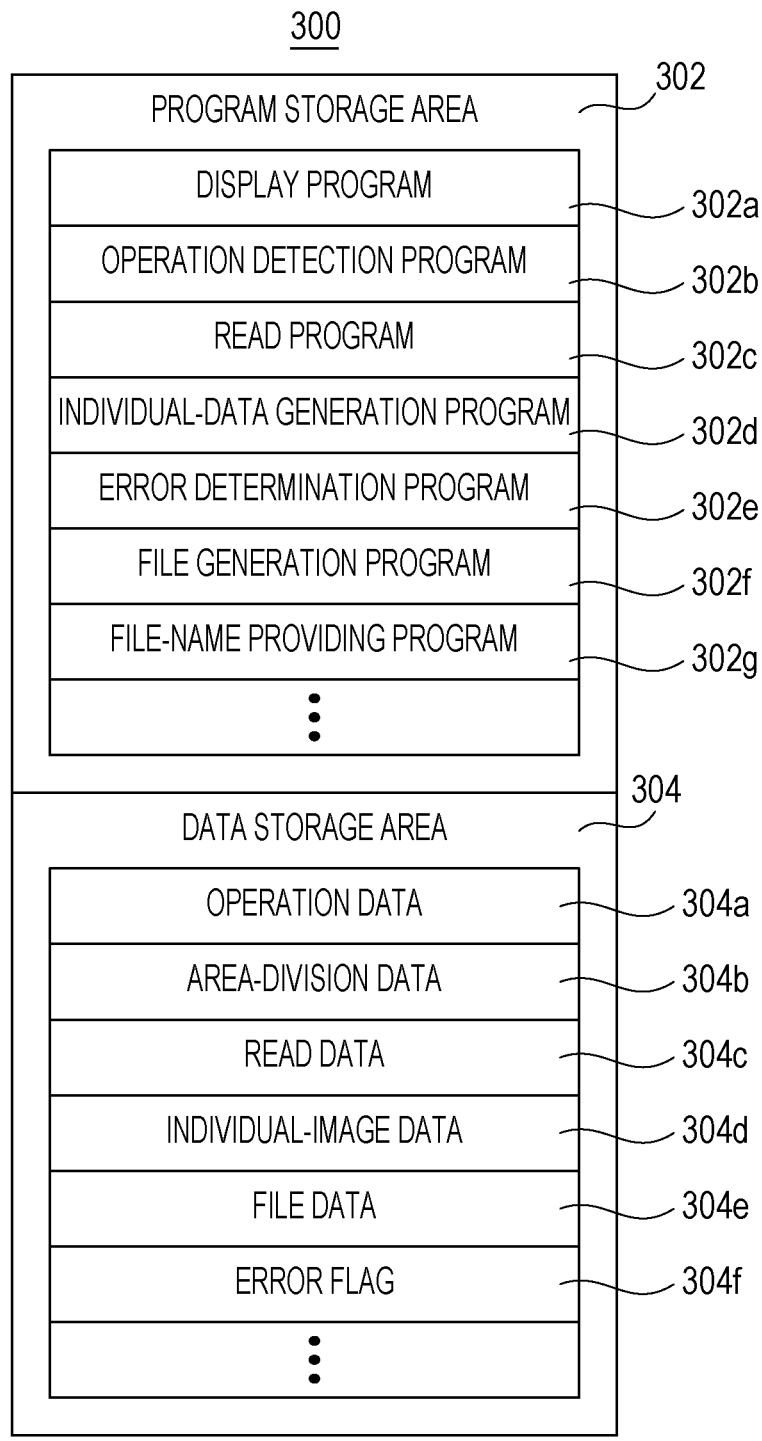
FIG. 6 is a diagram illustrating an exemplary memory map of the random-access memory (RAM) illustrated in FIG. 2.

FIG. 6 is a diagram illustrating an exemplary memory map 300 of the RAM 84 illustrated in FIG. 2. The RAM 84 includes a program storage area 302 and a data storage area 304. In the program storage area 302, control programs of the image forming apparatus 10 according to the first embodiment are stored. Since the image forming apparatus 10 includes the image reading apparatus 14, the control programs include control programs of the image reading apparatus 14.

As illustrated in FIG. 6, the control programs stored in the program storage area 302 include a display program 302a, an operation detection program 302b, a read program 302c, an individual-data generation program 302d, an error determination program 302e, a file generation program 302f, and a file-name providing program 302g.

The display program 302a is a program for using image generation data, including polygon data and texture data, to generate display image data corresponding to various screens displayed on the display 100, and for outputting the generated display image data on the display 100. The display program 302a is also a program for outputting, on the display 100, image data corresponding to the image obtained through scanning a document and image data obtained from an external computer. The operation detection program 302b is a program for detecting a user operation input using the touch panel 98 and the operation button 102. Touch coordinates data received due to an operation on the touch panel 98 is detected, or operation data or an operation signal obtained through an operation on the operation button 102 is detected. The detected data is temporarily stored in the data storage area 304.

The read program 302c is a program for reading (scanning) a document image and outputting an image signal (image data) corresponding to the read image. As described above, when the multi-crop mode is switched on, the read program 302c causes the entire image of the read area 200, including images of multiple documents placed on the document platen 16, to be scanned, and causes the image data for the entire image to be output. In the first embodiment, as described above, the whole front-side image data and the whole back-side image data are output.

The individual-data generation program 302d is a program for cutting out the images of the documents individually, and generating pieces of image data corresponding to the individual document images obtained through the cutting-out. In the first embodiment, as described above, for each of the area divisions R1 to R4, the individual front-side image data and the individual back-side image data are generated.

The error determination program 302e is a program for determining whether or not a read error is present in the generated pieces of individual front-side image data and individual back-side image data. Following the error determination program 302e, when it is determined that a read error is present in the individual front-side image data and the individual back-side image data, an error flag 304f described below is updated according to the determination result.

The file generation program 302f is a program for generating an image file for each of the area divisions R1 to R4, in which the individual front-side image data and the individual back-side image data are added together. The file-name providing program 302g is a program for providing a file name to an image file generated according to the file generation program 302f. The file-name providing program 302g is also a program for adding, to the file name, a string indicating presence of a read error, when a read error is present in the individual front-side image data and/or the individual back-side image data included in an image file.

In the program storage area 302, other programs, such as a communication program and an image formation program, for controlling the functions provided for the image forming apparatus 10 are also stored (not illustrated).

In the data storage area 304, operation data 304a, area-division data 304b, read data 304c, individual-image data 304d, and file data 304e are stored.

The operation data 304a is touch coordinates data and/or operation data which are detected according to the operation detection program 302b. The touch coordinates data is received from the touch panel 98. The operation data is received from the operation button 102. The area-division data 304b is data for specifying the positions and the sizes of the area divisions R1 to R4 in the read area 200, and is, for example, coordinates data, which has two vertexes at the diagonal positions, for each of the area divisions R1 to R4.

The read data 304c is image data that is output according to the read program 302c. In the multi-crop mode, the whole front-side image data or the whole back-side image data is stored as the read data 304c. The individual-image data 304d is the pieces of individual front-side image data and the pieces of individual back-side image data for the area divisions R1 to R4, which are generated according to the individual-data generation program 302d. After generation of the pieces of individual front-side image data for the area divisions R1 to R4, the pieces of individual back-side image data for the area divisions R1 to R4 are generated.

The file data 304e is data about image files in which, for each of the area divisions R1 to R4, the individual front-side image data and the individual back-side image data are added together, and which are generated according to the file generation program 302f. The file-name providing program 304g provides file names to the respective image files corresponding to the file data 304e. The image files provided with the respective file names are stored in the HDD 86.

In the data storage area 304, the error flag 304f is stored. The error flag 304f is flag data for determining whether or not a read error is present in the individual front-side image data or the individual back-side image data included in the image file corresponding to each of the area divisions R1 to R4. The error flag 304f is constituted by four bit registers which correspond to the area divisions R1, R2, R3, and R4 in this sequence from the most significant bit. When no read errors are present in the individual front-side image data and the individual back-side image data included in the image file corresponding to each of the area divisions R1 to R4, the corresponding register is set to 0. When a read error is present in the individual front-side image data or the individual back-side image data included in the image file, the register is set to 1.

In the data storage area 304, other data such as image formation data used to perform the control programs is stored, or other flags used to perform the control programs are stored (not illustrated).

Figure 7:
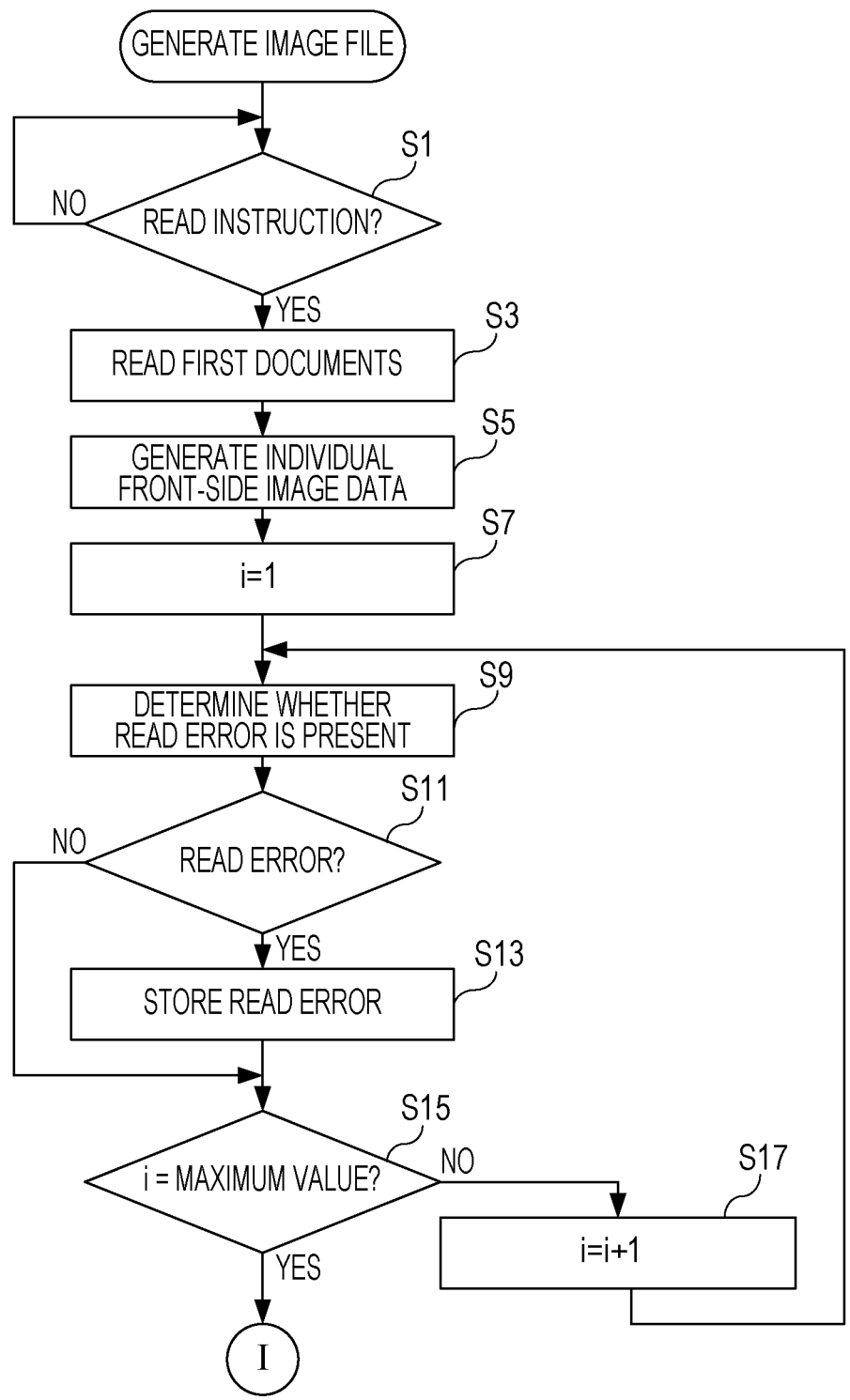
FIG. 7 is a flowchart of a part of an exemplary image file generation process performed by the central processing unit (CPU) illustrated in FIG. 2.
Figure 8:
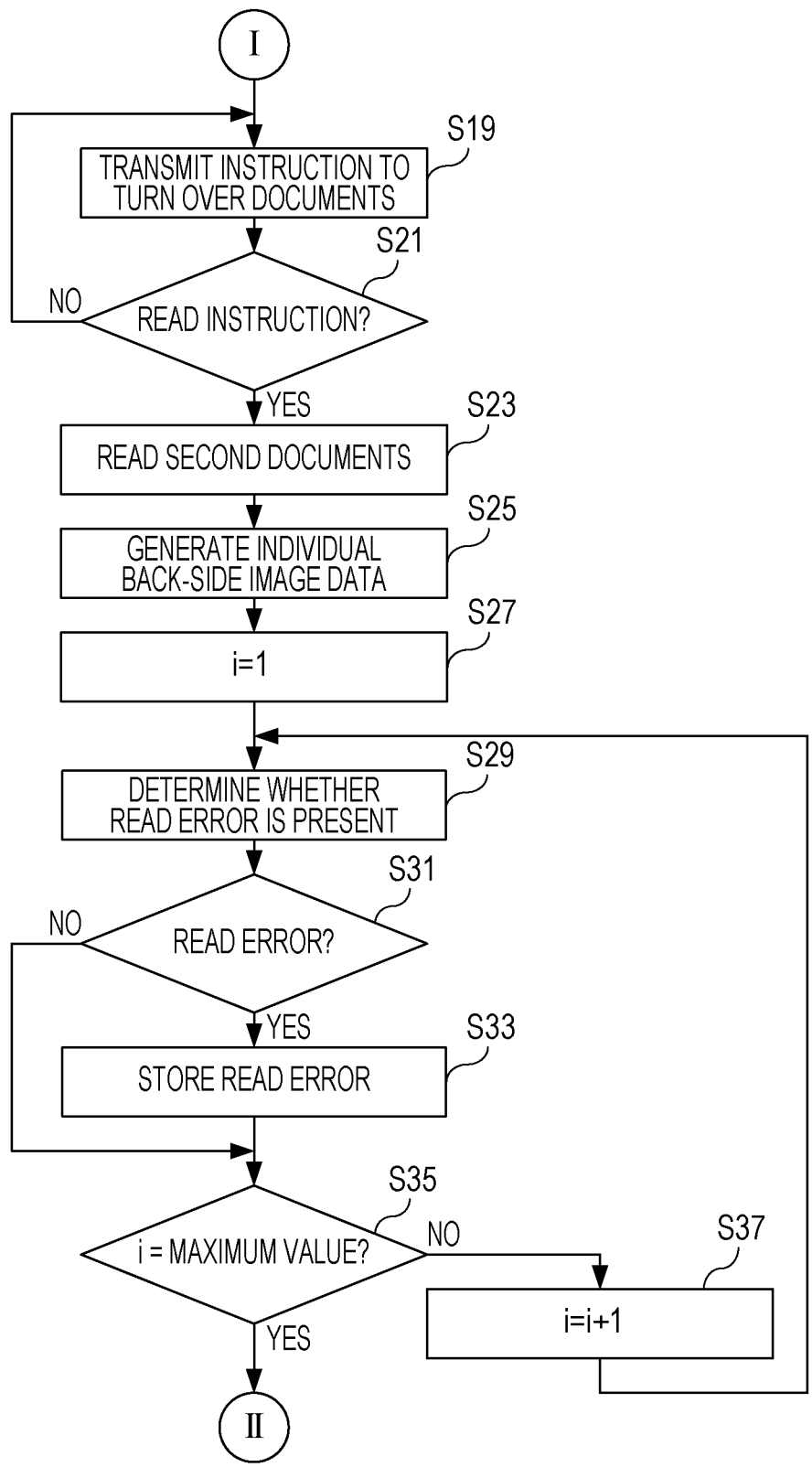
FIG. 8 is a flowchart which is subsequent to that in FIG. 7 and which describes another part of the image file generation process performed by the CPU illustrated in FIG. 2.
Figure 9:
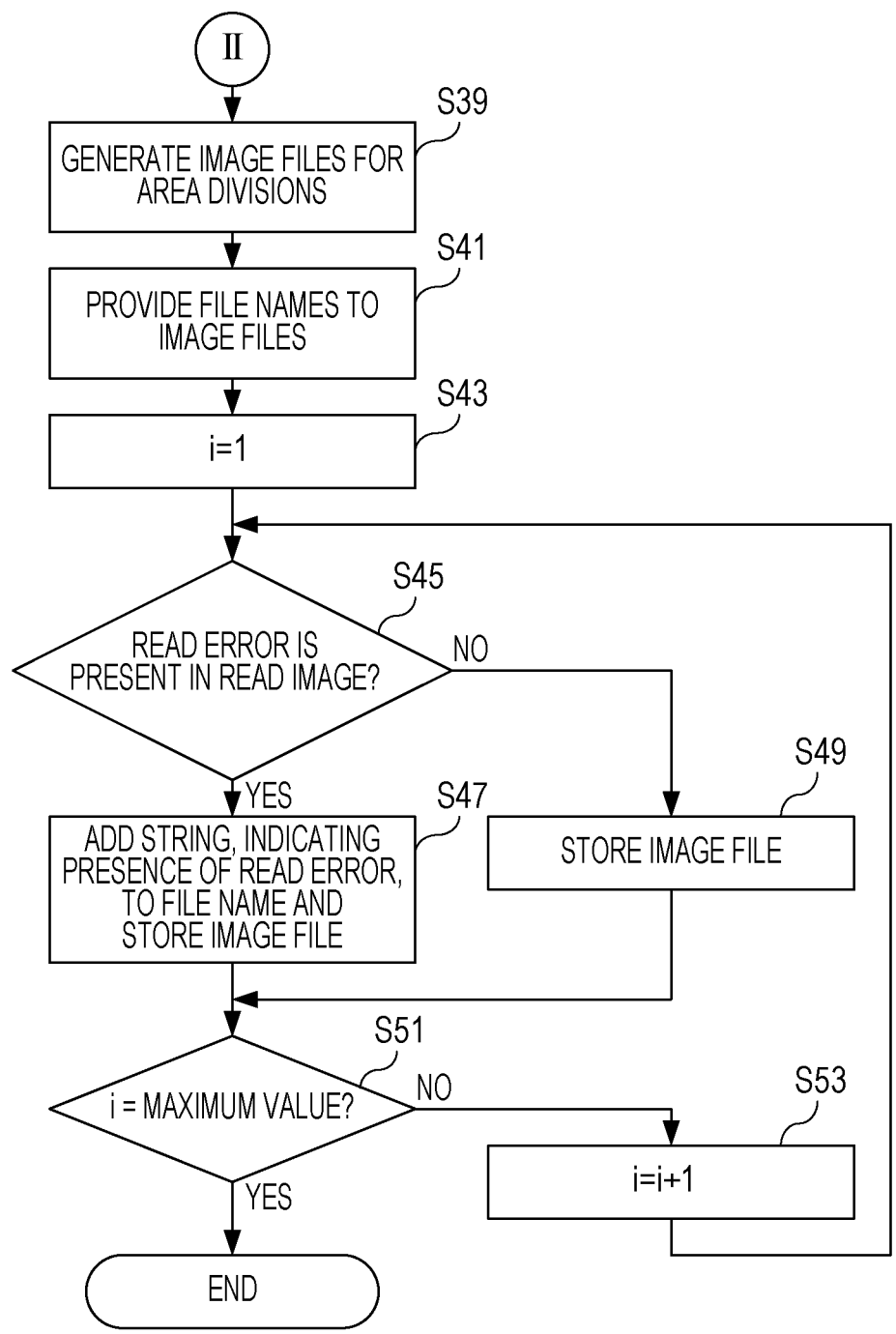
FIG. 9 is a flowchart which is subsequent to that in FIG. 8 and which describes another part of the image file generation process performed by the CPU illustrated in FIG. 2.

FIGS. 7 to 9 are flowcharts of an image file generation process performed by the CPU 80 illustrated in FIG. 2. Referring to FIGS. 7 to 9, the image file generation process will be described below. Repeated description about the process will be avoided.

When a user switches on the multi-crop mode, as illustrated in FIG. 7, the CPU 80 starts the image file generation process. In step S1, the CPU 80 determines whether or not a reading instruction has been given. In this step, the CPU 80 determines whether or not the start button has been operated.

Before giving a reading instruction, the user places multiple documents on the document platen 16 as illustrated in FIG. 4. Prior to start of the image file generation process, the area-division data 304b is stored in the data storage area 304.

If the determination result is "NO" in step S1, that is, if a reading instruction has not been given, the process returns to step S1. In contrast, if the determination result is "YES" in step S1, that is, a reading instruction has been given, the first process of reading documents is performed in step S3. In step S5, the individual front-side image data is obtained for each of the area divisions R1 to R4. At that time, each individual front-side image is provided with identification information about the corresponding one of the area divisions R1 to R4. That is, in execution of steps S3 and S5, the whole front-side image including the front surface images of the documents is obtained, and the individual front-side images of the respective area divisions R1 to R4 are cut out from the whole front-side image. When the whole front-side image is obtained in step S3, data corresponding to the whole front-side image is stored in the data storage area 304 as the read data 304c. When the individual front-side images for the respective area divisions R1 to R4 are cut out from the whole front-side image, the pieces of individual front-side image data provided with the respective pieces of identification information about the area divisions R1 to R4 are stored in the data storage area 304 as the individual-image data 304d. The same is true in steps S23 and S25 described below.

In step S7, an initial value is set to the variable i (i=1). The variable i is a variable for identifying the area divisions R1 to R4 individually. The variable i which is set to 1 indicates the area division R1. The variable i which is set to 2 indicates the area division R2. The variable i which is set to 3 indicates the area division R3. The variable i which is set to 4 indicates the area division R4. The same is true throughout the specification.

In step S9, it is determined whether or not a read error is present in the individual front-side image data of the area division Ri. In the next step S11, it is determined whether or not a read error has been detected in the individual front-side image data of the area division Ri.

If the determination result is "NO" in step S11, that is, if no read errors are present in the individual front-side image data of the area division Ri, the process proceeds to step S15. In contrast, if the determination result is "YES" in step S11, that is, if a read error is present in the individual front-side image data of the area division Ri, the read error is stored in step S13, and the process proceeds to step S15. In step S13, the CPU 80 sets the bit, which corresponds to the area division Ri, of the error flag 304f to 1. The same is true in step S33 described below.

In step S15, it is determined whether or not the variable i is equal to the maximum value (in the first embodiment, 4). That is, it is determined whether or not the determination as to whether or not a read error is present has been performed on the individual front-side image data for all of the area divisions Ri. If the determination result is "NO" in step S15, that is, the variable i is not equal to 4, the variable i is incremented by 1 (i=i+1) in step S17, and the process returns to step S9. That is, it is determined whether or not a read error is present in the individual front-side image data of another area division Ri.

In contrast, if the determination result is "YES" in step S15, an instruction to turn over the documents is given in step S19 illustrated in FIG. 8. As described above, a message that the documents are to be turned over is displayed on the display 100.

In step S21, it is determined whether or not a reading instruction has been given. If the determination result is "NO" in step S21, the process returns to step S19. In contrast, if the determination result is "YES" in step S21, the second process of reading documents is performed in step S23, that is, the whole back-side image including the back surface images of the documents is obtained. In step S25, the individual back-side image data is obtained for each of the area divisions R1 to R4. In execution of step S23, the read data 304c is overwritten with data corresponding to the whole back-side image. In execution of step S25, the pieces of individual back-side image data are stored as the individual-image data 304d in addition to the pieces of individual front-side image data.

In the next step S27, the initial value is set to the variable i. In step S29, it is determined whether or not a read error is present in the individual back-side image data of the area division Ri. In step S31, it is determined whether or not a read error has been detected in the individual back-side image data of the area division Ri.

If the determination result is "NO" in step S31, the process proceeds to step S35. In contrast, if the determination result is "YES" in step S31, the read error is stored in step S33, and the process proceeds to step S35.

If a read error is present in the individual front-side image data of the area division Ri and the corresponding bit of the error flag 304f has been already set to 1, the process in step S33 is skipped.

In step S35, it is determined whether or not the variable i is equal to the maximum value. If the determination result is "NO" in step S35, the variable i is incremented by 1 in step S37, and the process returns to step S29. In contrast, if the determination result is "YES" in step S35, image files are generated for the area divisions R1 to R4 in step S39 illustrated in FIG. 9. In this step, the CPU 80 generates the image files, in each of which the individual front-side image data and the individual back-side image data which are provided with the same identification information are added together. At that time, the data corresponding to each generated image file is stored in the data storage area 304 as the file data 304e. In step S41, as described above, information about Christian Era year, day, and time is obtained from the RTC, and the corresponding file name is provided to each image file.

In step S43, the initial value is set to the variable i. In step S45, it is determined whether or not a read error is present in the read image of the area division Ri. In this step, the CPU 80 refers to the error flag 304f, and determines whether or not the bit corresponding to the area division Ri has been set to 1. The read image indicates the individual front-side image and the individual back-side image for the area division Ri.

If the determination result is "YES" in step S45, that is, if a read error is present in the read image of the area division Ri, in step S47, a string indicating presence of a read error is added to the file name of the image file, and the image file is stored in the HDD 86. Then, the process proceeds to step S51.

In contrast, if the determination result is "NO" in step S45, that is, if no read errors are present in the read image of the area division Ri, in step S49, the image file is stored in the HDD 86, and the process proceeds to step S51.

In execution of step S47 or S49, the data corresponding to the image file for the area division Ri is deleted from the data storage area 304. The data corresponding to an image file is a part of the file data 304e.

In step S51, it is determined whether or not the variable i is equal to the maximum value. If the determination result is "NO" in step S51, the variable i is incremented by 1 in step S53, and the process returns to step S45. In contrast, if the determination result is "YES" in step S51, the image file generation process ends.

According to the first embodiment, when a read error is present in individual-image data obtained through scanning of multiple documents placed in the respective area divisions of the document platen, the image files generated for the respective area divisions are stored in such a manner that the presence of a read error may be recognized. Therefore, without displaying the image data included in each image file, presence of a read error in the image data may be recognized. That is, whether or not a document has been successfully read may be recognized easily, achieving savings in time and effort of a user.

In the first embodiment, when a read error is present in the individual front-side image data and/or the individual back-side image data included in an image file, a string indicating presence of a read error is added to the file name of the image file. However, this is not limiting. The HDD 86 may include two storage areas: a storage area for storing image files which do not include image data having read errors (for example, a folder for normal images); and a storage area for storing image files including image data having read errors (for example, a folder for images having read errors). Thus, image files which do not include image data having read errors may be stored separately from image files including image data having read errors. Alternatively, instead of storage in the different folders, the image files may be stored in different storage media. In this way, whether or not a document has been successfully read may be also recognized easily on the basis of the location or the medium in which the image file is stored. In this case, when a read error is present in the individual front-side image data or the individual back-side image data included in an image file, a string indicating presence of a read error is not necessarily added to the file name of the image file.

In the first embodiment, when a read error is present in the individual front-side image data and/or the individual back-side image data included in an image file, a string indicating presence of a read error is added to the file name of the image file. This is not necessarily limiting. Alternatively, a string indicating presence of a read error in the individual front-side image data, or a string indicating presence of a read error in the individual back-side image data may be added. For example, when a read error is present in the individual front-side image data, a string, such as "NG_1_" or "ERR_1_", is added. When a read error is present in the individual back-side image data, a string, such as "NG_2_" or "ERR_2_", is added. When read errors are present in both the individual front-side image data and the individual back-side image data, a string, "NG_1-2_" or "ERR_1-2_", is added. In this way, presence of a read error for the front surface and/or the back surface of a document may be recognized. It may be determined whether or not scanning is to be performed again in accordance with the surface for which a read error is present. In this case, an error flag for the front-side image and an error flag for the back-side image are to be prepared.

In the first embodiment, the first to fourth cases are taken as examples in which a read error is present in an image obtained through scanning. Also when an image obtained through scanning lies in multiple areas among the area divisions R1 to R4, a read error may be present. However, when an image obtained through scanning lies in multiple areas, it is difficult to determine which division among the area divisions R1 to R4 corresponds to the image. Therefore, in the first embodiment, when an image obtained through scanning lies in multiple divisions among the area divisions R1 to R4, it is not determined that a read error is present. Accordingly, when it is determined that the individual front-side image data or the individual back-side image data lies in multiple divisions among the area divisions R1 to R4, the document reading process may be performed again from the beginning.

Second Embodiment

The image reading apparatus 14 according to a second embodiment is the same as that according to the first embodiment except that, when a read error is present in the individual front-side image data and/or the individual back-side image data obtained through scanning of a document, an image file for the images obtained through scanning of the document is not generated. Thus, different points will be described, and repeated description will be avoided.

In the second embodiment, as described above, when an image file is not generated, a user is notified that the image file is not to be generated. Therefore, in the second embodiment, the control programs further include a program for transmitting a notification that an image file is not to be generated.

Figure 10:
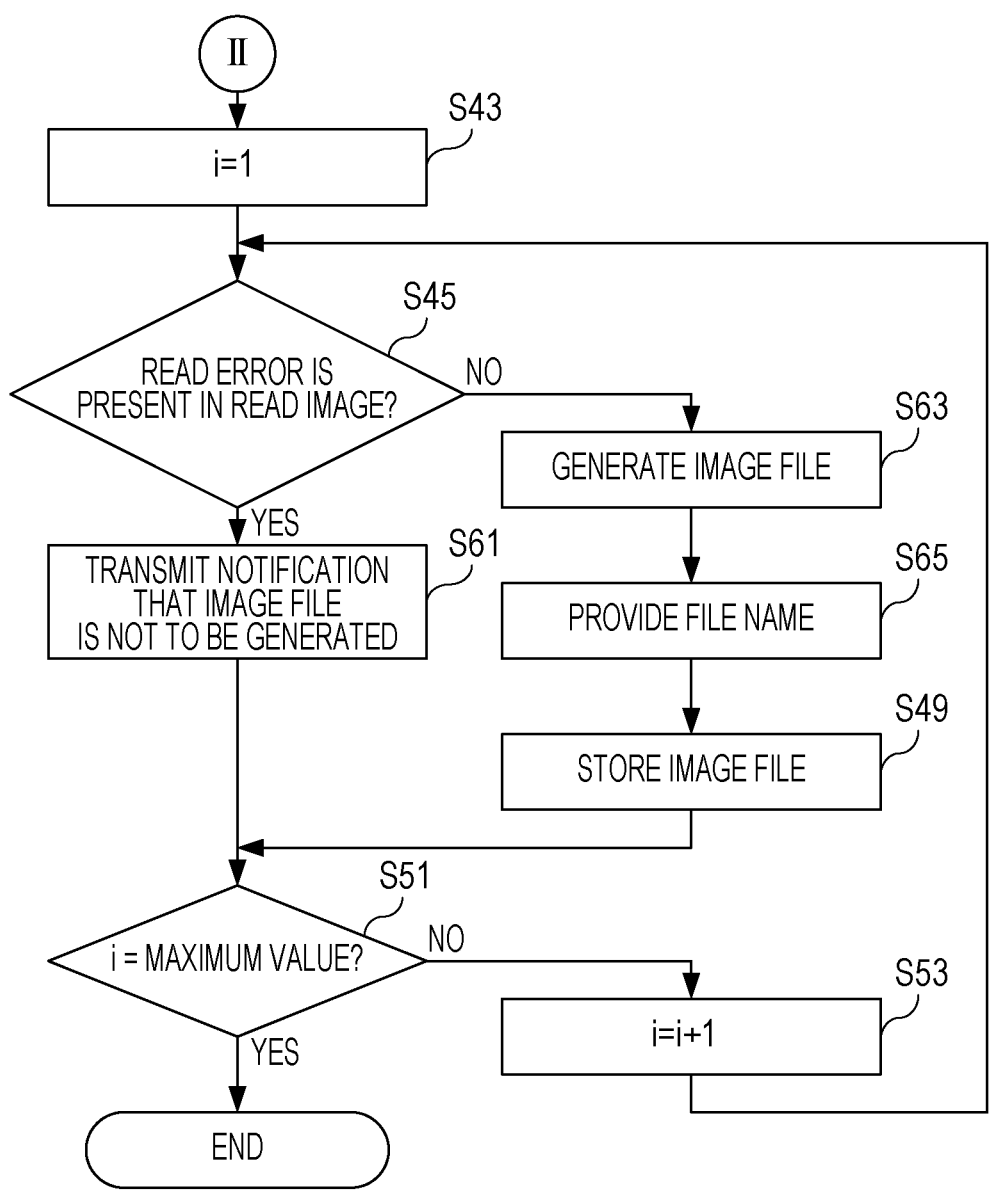
FIG. 10 is a flowchart which is subsequent to that in FIG. 9 and which describes a part of an image file generation process performed by the CPU, according to a second embodiment.

Specific operations are implemented by changing a part of the image file generation process, which is illustrated in FIGS. 7 to 9, according to the first embodiment. Specifically, the processes in steps S39 to S53 illustrated in FIG. 9 are changed to the processes illustrated in FIG. 10. As illustrated in FIG. 10, in the second embodiment, the processes in steps S39 and S41 are deleted. In the second embodiment, instead of step S47, step S61 is performed. Further, in the second embodiment, steps S63 and S65 are performed between step S45 and step S49.

That is, for each of the area divisions R1 to R4, the individual front-side image data and the individual back-side image data are obtained. Then, as illustrated in FIG. 10, the initial value is set to the variable i in step S43, and it is determined whether or not a read error is present in the read image of the area division Ri in step S45.

If the determination result is "YES" in step S45, a notification that an image file for the document placed in the area division Ri is not to be generated is transmitted in step S61, and the process proceeds to step S51. In step S61, the CPU 80 controls the display control circuit 94 so that the message that an image file for the document placed in the area division Ri is not to be generated is displayed on the display 100.

In contrast, if the determination result is "NO" in step S45, an image file for the area division Ri is generated in step S63. In step S65, the file name of the image file generated in step S63 is provided, and the process proceeds to step S49.

According to the second embodiment, when a read error is present in a read image, an image file including the read image is not generated. Therefore, no operation of checking if a read error for a generated image file has occurred is performed.

According to the second embodiment, when an image file is not generated, a message describing this is displayed. Therefore, documents for which read errors have occurred are easily recognized. Accordingly, a user may scan again, in the multi-crop mode, only documents whose image files have not been generated.

Third Embodiment

The image reading apparatus 14 according to a third embodiment is the same as that according to the first embodiment except that, instead of reading image files obtained by scanning the front surfaces and the back surfaces of the documents, single-sided or double-sided documents are scanned and image files for the area divisions R1 to R4 are generated. Thus, different points will be described, and repeated description will be avoided.

According to the first embodiment and the second embodiment, the front surface and the back surface of a single sheet of document are read. Therefore, the number of sheets of document is set to one, and the number of scanning operations is set to two. In the third embodiment, only a single side of a document may be read. The number of sheets of document and the number of scanning operations are not particularly limiting. In response to a user giving an instruction to end the scanning operations, the image files for the area divisions R1 to R4 are generated and stored.

For example, every time a scanning operation is performed, a continue/finish instruction screen including a message, indicating that, in the case where another scanning operation is to be performed, next documents are to be set before an operation on the start button, and that, in the case where no more scanning operations are performed, the finish button is to be operated, is displayed on the display 100. Like the start button, the finish button is a software button disposed on the operation panel.

In the third embodiment, in scanning of multiple sheets of document, only the single sides may be scanned for a subset or all of the documents. The number (n) of scanning operations is counted. An image of the entire read area 200 including the images of the scanned sides of the documents is called a "whole n-th image". Individual document images which are cut out from the whole n-th image are called "individual n-th images".

Figure 11:
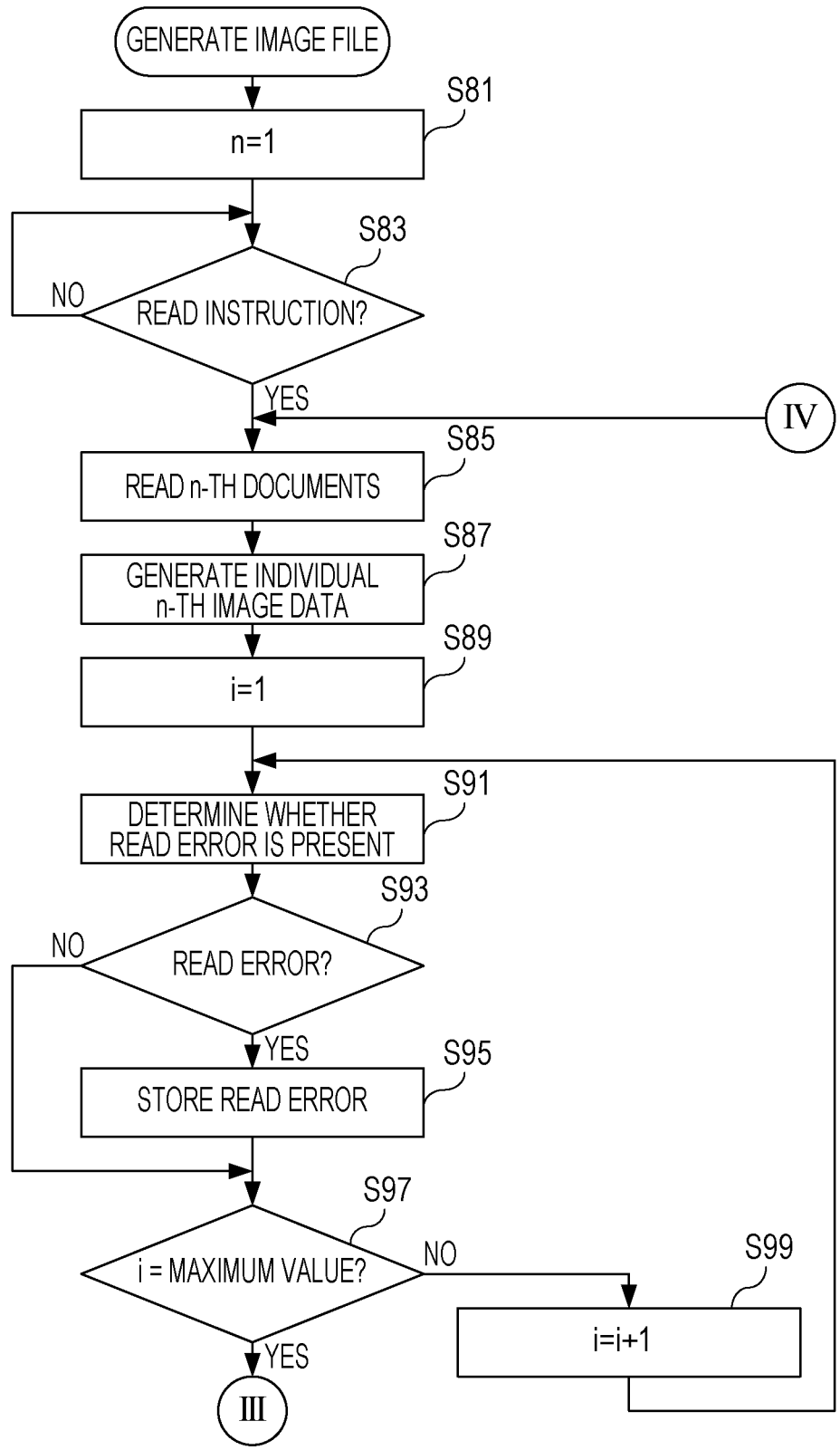
FIG. 11 is a flowchart of a part of an image file generation process performed by the CPU, according to a third embodiment.
Figure 12:
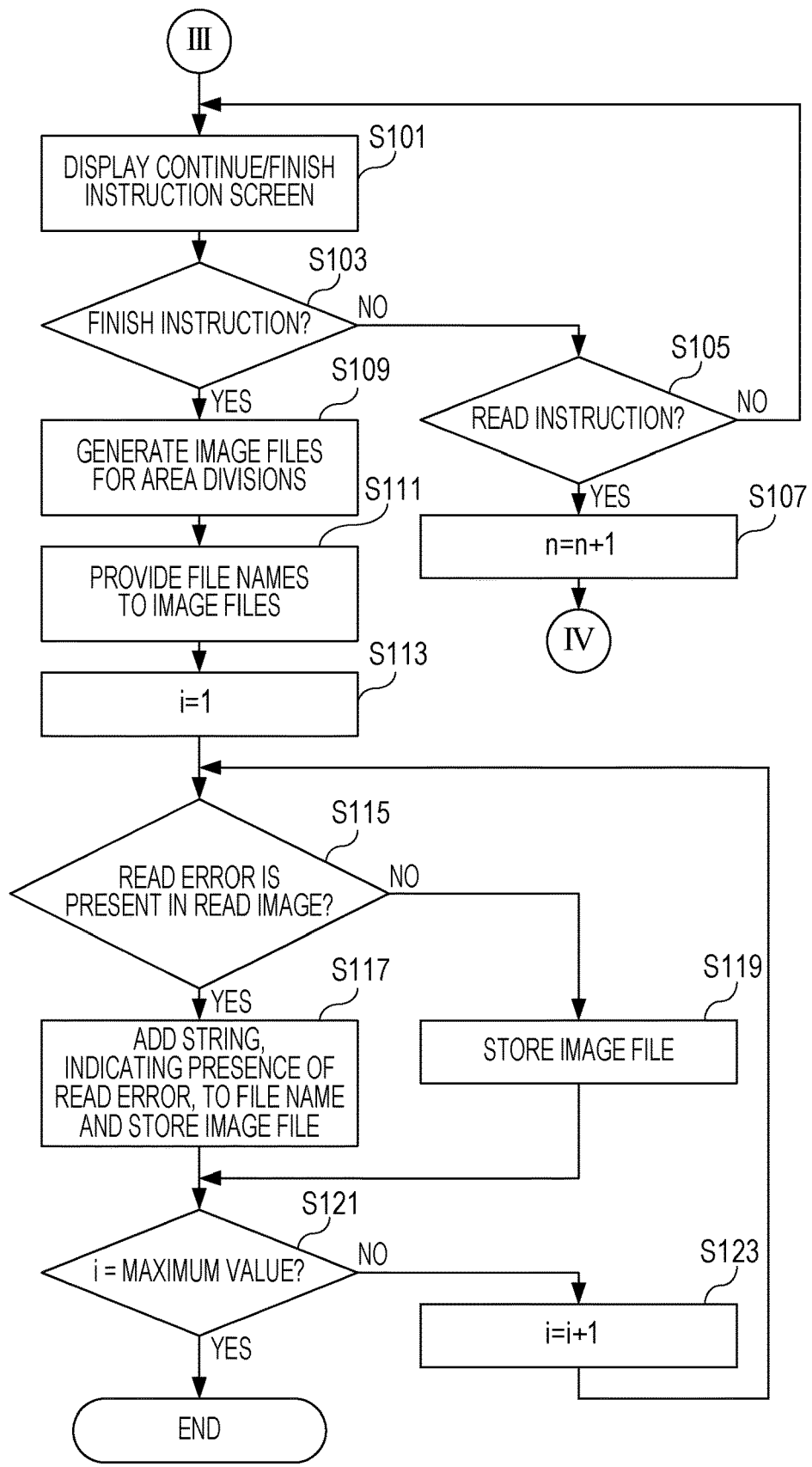
FIG. 12 is a flowchart which is subsequent to that in FIG. 11 and which describes another part of the image file generation process performed by the CPU, according to the third embodiment.

Specifically, the CPU 80 performs the image file process illustrated in FIGS. 11 and 12. Referring to FIGS. 11 and 12, the image file process will be described below. The same description as that in the first embodiment will be made briefly.

When a user switches on the multi-crop mode, as illustrated in FIG. 11, the CPU 80 starts the image file generation process. In step S81, the initial value is set to the variable n (n=1). In the next step S83, it is determined whether or not a reading instruction has been given.

If the determination result is "NO" in step S83, that is, if a reading instruction has not been given, the process returns to step S83. In contrast, if the determination result is "YES" in step S83, the n-th process of reading documents is performed in step S85. In step S87, the pieces of individual n-th image data for the respective area divisions R1 to R4 are obtained. At that time, to the individual n-th images, identification information about the respective area divisions R1 to R4 is added.

In step S89, the initial value is set to the variable i (i=1). In step S91, it is determined whether or not a read error is present in the individual n-th image data of the area division Ri. In the next step S93, it is determined whether or not a read error has been detected for the individual n-th image data of the area division Ri.

If the determination result is "NO" in step S93, the process proceeds to step S97. In contrast, if the determination result is "YES" in step S93, the read error is stored in step S95, and the process proceeds to step S97.

In step S97, it is determined whether or not the variable i is equal to the maximum value (in the third embodiment, 4). If the determination result is "NO" in step S97, the variable i is incremented by 1 (i=i+1) in step S99, and the process returns to step S91.

In contrast, if the determination result is "YES" in step S97, the continue/finish instruction screen is displayed on the display 100 in step S101 illustrated in FIG. 12. In the next step S103, it is determined whether or not a finish instruction has been given. In this step, the CPU 80 determines whether or not the finish button has been operated.

If the determination result is "NO" in step S103, that is, if a finish instruction has not been given, it is determined whether or not a reading instruction has been given in step S105. If the determination result is "NO" in step S105, the process returns to step S101. In contrast, if the determination result is "YES" in step S105, the variable n is incremented by 1 (n=n+1) in step S107, and the process returns to step S85 illustrated in FIG. 11.

If the determination result is "YES" in step S103, that is, if a finish instruction has been given, image files are generated for the respective area divisions R1 to R4 in step S109. In this step, the CPU 80 generates image files. In each of the image files, multiple pieces of individual n-th image data, to which the same identification information is provided and whose numbers indicating n are different from each other, are added together. In step S111, the image files are provided with the respective file names.

In step S113, the initial value is set to the variable i. In step S115, it is determined whether or not a read error is present in the read image of the area division Ri. In this step, the CPU 80 refers to the error flag 304*f*, and determines whether or not the bit corresponding to the area division Ri has been set to 1. The read image indicates multiple individual n-th images of the area division Ri.

If the determination result is "YES" in step S115, that is, if a read error is present in the read image of the area division Ri, in step S117, a string indicating presence of a read error is added to the file name of the image file, and the image file is stored in the HDD 86. Then, the process proceeds to step S121.

In contrast, if the determination result is "NO" in step S115, that is, if no read errors are present in the read image of the area division Ri, the image file is stored in the HDD 86 in step S119, and the process proceeds to step S121.

In step S121, it is determined whether or not the variable i is equal to the maximum number. If the determination result is "NO" in step S121, the variable i is incremented by 1 in step S123, and the process returns to step S115. In contrast, if the determination result is "YES" in step S121, the image file generation process ends.

Also in the third embodiment, similarly to the first embodiment, without displaying the image data included in each image file, it may be recognized presence of a read error in the image data.

A modified embodiment of the second embodiment may be applied to the third embodiment. Specifically, steps S109 and S111 are deleted. Instead of step S117, step S61 illustrated in FIG. 10 is performed. Further, steps S63 and S65 illustrated in FIG. 10 are performed between step S115 and step S119.

The specific numbers described in the embodiments described above are examples, and may be changed appropriately in accordance with actual products.

The present disclosure contains subject matter related to that disclosed in Japanese Priority Patent Application JP 2018-014236 filed in the Japan Patent Office on Jan. 31, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image reading apparatus in which a read area of a document platen is divided into a plurality of areas and in which image data is obtained by performing a read operation of reading at once images of a plurality of documents placed in the respective areas, the image data describing a corresponding one of the documents, the image data being obtained in association with a corresponding one of the areas in which the corresponding one of the plurality of documents is placed, the image reading apparatus comprising:
   an error detector that detects whether or not the image data has a read error; and
   a file-name provider that performs a different operation on the image data depending on whether or not the image data has a read error.

2. The image reading apparatus according to claim 1, wherein the file-name provider
   generates, for each of the plurality of areas, an image file including the image data associated with the area,
   when a read error is present in a part or all of the image data included in the image file, stores the image file in a storage medium in such a manner that presence of a read error is recognizable, and when no read error is present in all of the image data included in the image file, stores the image file in a storage medium in such a manner that absence of a read error is recognizable.

3. The image reading apparatus according to claim 2, wherein the file-name provider provides a file name to the image file when a read error is present in a part or all of the image data included in the image file, the file name including information indicating presence of a read error.

4. The image reading apparatus according to claim 1, wherein the file-name provider deletes, for each of the plurality of areas, the
image data associated with the area, when a read error is present in a part or all of the image data, and,
   generates, for each of the plurality of areas, an image file including the image data associated with the area, and stores the image file in a storage medium.

5. The image reading apparatus according to claim 1, wherein a plurality of read operations are performed, wherein the file-name provider
   generates a plurality of image files for the respective areas, each of the plurality of image files being an image file in which a plurality of pieces of image data associated with a corresponding one of the areas are added together, the plurality of pieces of image data being obtained by performing the read operations,
   when a read error is present in a subset or all of the plurality of pieces of image data included in an image file among the plurality of image files, stores the image file in a storage medium in such a manner that presence of a read error is recognizable, and
   when no read error is present in all of the plurality of pieces of image data included in the image file, stores the image file in a storage medium in such a manner that absence of a read error is recognizable.

6. An image forming apparatus including an image reading apparatus in which a read area of a document platen is divided into a plurality of areas and in which image data is obtained by performing a read operation of reading at once images of a plurality of documents placed in the respective areas, the image data describing a corresponding one of the documents, the image data being obtained in association with a corresponding one of the areas in which the corresponding one of the plurality of documents is placed, the image forming apparatus comprising:
   an error detector that detects whether or not the image data has a read error; and
   a file-name provider that performs a different operation on the image data depending on whether or not the image data has a read error.

7. A control method for an image reading apparatus in which a read area of a document platen is divided into a plurality of areas and in which image data is obtained by performing a read operation of reading at once images of a plurality of documents placed in the respective areas, the
   image data describing a corresponding one of the documents, the image data being obtained in association with a corresponding one of the areas in which the corresponding one of the plurality of documents is placed, the method comprising:

determining whether or not the image data has a read error; and performing a different operation on the image data depending on whether or not the image data has a read error.

* * * * *